United States Patent Office 2,812,317
Patented Nov. 5, 1957

2,812,317

HYDROLYZED POLYACRYLONITRILE POLYMERS AND PROCESS OF PREPARING SAME

Gerald R. Barrett, Winchester, Mass., assignor to Monsanto Chemical Company, St. Louis, Mo., a corporation of Delaware No Drawing. Application August 19, 1953,
Serial No. 375,303

5 Claims. (Cl. 260—88.7)

The present invention relates to novel polymeric derivatives, particularly novel derivatives of polyacrylonitriles, and to processes of producing such derivatives.

It is one object of this invention to provide novel polymers, particularly novel polymers which are derived from polyacrylonitrile.

It is a further object of this invention to provide novel polymers which are soluble in aqueous solutions under acidic conditions.

It is a further object of this invention to provide a process for preparing novel polymeric derivatives from polyacrylonitrile, particularly polymeric derivatives which are soluble in aqueous solutions under acidic conditions.

Still further objects and advantages of this invention will become apparent from the following description and the appended claims.

The novel polymers of this invention comprise essentially a polyacrylonitrile in which from 40 to 80% of the nitrile groups have been hydrolyzed to carboxyl groups. The polymers may contain minor amounts of chemically combined modifying agents such as styrene, vinyl acetate, alkyl methacrylates, alkyl acrylates, acrylic acid or methacrylic acid as will be pointed out in greater detail hereinafter.

The novel polymers of this invention are prepared in general by first hydrolyzing a suspension or a substantially stable aqueous dispersion or emulsion of a polyacrylonitrile with an alkaline hydrolyzing agent, preferably an alkali metal hydroxide, while maintaining the polymer in a dispersed or emulsified state, until at least 40% of the nitrile groups of the polymer have been hydrolyzed to

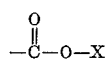

groups, where X is the cation of the hydrolyzing agent, and then precipitating the hydrolyzed polymer from the aqueous medium by means of an acid, preferably in the form of a plastic, coherent mass, whereby the

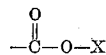

groups in the hydrolyzed polymer are converted to carboxyl groups. The precipitated polymer is preferably extracted to remove a substantial portion of electrolytes and acid anions therefrom and thereafter it is dried or is dissolved in an aqueous medium.

The aqueous suspension, dispersion or emulsion of the polymer used in the processes of this invention may be prepared in various ways. One suitable procedure comprises heating, preferably at the reflux temperature, an aqueous emulsion of monomeric acrylonitrile in the presence of a polymerization catalyst and an amount of an emulsifying agent sufficient to provide a suspension or stable dispersion or emulsion during and after polymerization. This procedure is conventional and is well known in the art. The emulsion polymerization procedure may be modified to provide low molecular weight polymers by the use of relatively large amounts of organic peroxide or by the use of retarders such as beta nitro styrene or the retarders disclosed generally in United States Patent No. 2,537,015. Chain transfer agents may also be used.

The polymers produced by the foregoing procedure may be modified to some extent by incorporating a vinyl monomer, which is copolymerizable with acrylonitrile and contains a single $CH_2=C<$ group. As examples of such vinyl monomers may be mentioned styrene or ring substituted styrene, vinyl acetate, alkyl methacrylates such as methyl methacrylates, alkyl acrylates such as methyl acrylate and the like. The amount of modifying monomer used depends primarily on the particular monomer employed. In the case of styrene or ring substituted styrene amounts up to 10% by weight, based on the total monomers, may be used while in the case of alkyl methacrylates amounts up to 20% by weight, based on the total monomers, may be employed. In those instances where vinyl acetate or alkyl acrylates, or both, are used as modifying monomers, it is possible to use up to 45% of such monomers, based on the total monomers. When modifying vinyl monomers are used as described above and the rate of reaction between the modifying monomer and the acrylonitrile is not the same as the homopolymerization rate of the acrylonitrile, it is usually necessary to add the modifying monomer and the acrylonitrile to an aqueous solution of a polymerization catalyst and emulsifying agent, while heating, at substantially the same rate as the reaction rate of such modifying monomer and the acrylonitrile in order to obtain the final polymer (which is really a copolymer) of uniform composition. The use of modifying monomers as described above introduces various complications in the polymerization procedure and also alters, somewhat, the properties of the polymers of this invention. However, the use of modifying monomers does have the advantage of enabling the preparation of stable dispersions which are easier to saponify and hydrolyze than suspensions of relatively coarse particles of homopolymers of acrylonitrile. For this reason it is preferred to employ such modifying monomers.

By using up to 3%, preferably 1 to 2%, by weight of the total monomers of acrylic acid, methacrylic acid or, in some cases, alkyl acid esters of maleic acid, with the acrylonitrile or with the acrylonitrile and modifying monomers hereinbefore described it is possible to produce aqueous polymeric dispersions or emulsions which have greater stability during the subsequent hydrolysis step, even without the addition of added emulsifying agents, and accordingly the use of such modifying monomers is preferred in the preparation of the starting dispersions or emulsions employed in the processes of this invention.

In carrying out the emulsion polymerization procedure described above, it is possible to use a wide variety of emulsifying or dispersing agents, including anionic surface active agents which are soluble under acid conditions, for example, alkali metal salts of alkyl benzene sulfonic acids, in which the alkyl group contains 10 or more carbon atoms, sulfated alcohols containing 10 or more carbon atoms and alkali metal salts of sulfo dialkyl succinic acid, and non-ionic sulface active agents such as polyoxyethylene esters of tall oil or alkylated phenols, in which the alkyl group contains at least 8 carbon atoms. Other emulsifying agents conventionally used in acidic emulsion polymerization processes will be apparent to those skilled in the art. A wire variety of emulsion polymerization catalysts may be used including potassium persulfate and the organic peroxides such as benzoyl peroxide and the like.

Stable aqueous dispersions of polyacrylonitirile per se or the modified polyacrylonitrile may be prepared by aqueous emulsion polymerization of the monomers in the presence of liquid, non-polymerizable chlorine-containing organic compounds such as ethylene dichloride as described in the Harrison Patent No. 2,471,742 or in the presence of liquid, non-polymerizable aromatic hydrocarbons such as benzene, as described in the Harrison Patent No. 2,471,743, followed by removal of the chlorine-containing organic compound or the aromatic hydrocarbon by steam distillation or distillation under reduced pressure.

The aqueous suspensions or dispersions of polyacrylonitrile employed in the process of this invention may be prepared by conventional procedures other than emulsion polymerization techniques.

In preparing the novel polymers of this invention, the aqueous suspension, dispersion or emulsion of polyacrylonitrile is first treated with an aqueous solution of an alkaline hydrolyzing agent such as sodium hydroxide to effect a partial hydrolysis or saponification of the nitrile groups of the polymer to form

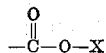

groups, where X is the cation of the hydrolyzing agent. This partial hydrolysis is carried out under conditions such that substantially no coagulated polymer is formed in the dispersion since hydrolysis proceeds most rapidly and uniformly in a smooth dispersion or emulsion which is substantially free of coagulated polymer. This is preferably accomplished by using relatively dilute aqueous solutions of the alkaline hydrolyzing agent, for example, solutions containing less than 5% of the hydrolyzing agent. The amount of hydrolyzing agent used in this stage of the hydrolysis is preferably such as to hydrolyze about 4 to 10% of the nitrile groups of the polymer. Another factor of some importance in this partial hydrolysis step is the concentration of polymer in the hydrolyzing mixture which is maintained sufficiently low to avoid the coagulation of the polymer. In general, coagulation of the copolymer is avoided under the above conditions when the hydrolysis mixture contains less than 15% by weight of polymer. During the initial stages of the partial hydrolysis it is usually necessary to add an emulsifying agent of the type used in the preparation of the original polymer dispersion or emulsion along with the hydrolyzing agent in order to maintain the stability of the dispersion or emulsion. Such emulsifying agent is preferably incorporated in the aqueous solution of the hydrolyzing agent and is added in amounts sufficient to maintain the dispersion in a stable condition, say in concentrations of about 0.5 to 3% by weight based on the solution of the hydrolyzing agent. However, an emulsifying agent need not be used in those instances where the polymer has been modified, during its preparation, with from 1 to 3% by weight of acrylic acid or methacrylic acid since such modified polymers have greater stability in dispersion during partial hydrolysis.

The partial hydrolysis proceeds very slowly at room temperatures, and it is generally necessary to use elevated temperatures to obtain a practical rate of hydrolysis or saponification of the nitrile groups in the polymer. Generally, temperatures ranging from about 70° C. up to the boiling temperature of the hydrolysis mixture at atmospheric pressure are satisfactory for this purpose.

After the initial hydrolysis or saponification has taken place, which usually requires from about 5 to 20 minutes or longer depending on the temperature and other factors, further quantities of alkaline hydrolyzing agent are added in one or more additions, preferably in at least two additions, to complete the hydrolysis or saponification to the extent desired, namely, 40 to 80% of the nitrile groups of the starting polymer, except when the polymer is composed of acrylonitrile modified with styrene or alkyl methacrylates in which case saponification of 90 to 100% of the nitrile groups may be required. The hydrolyzing agent is preferably added in the form of an aqueous solution. The total amount of alkaline hydrolyzing agent added varies from about the theoretical amount required to attain the desired degree of saponification or hydrolysis up to a considerable excess depending on the conditions used and the degree of saponification or hydrolysis desired. During this stage of hydrolysis the use of an emulsifying agent is usually not necessary, although an emulsifying agent may be used if desired. The temperature during this stage of hydrolysis should be relatively high. Satisfactory operating temperatures are between about 70° C. and the boiling point of the dispersion at atmospheric pressure or superatmospheric pressure. The duration of heating is generally between about 10 and 60 minutes depending on the temperature used and the degree of hydrolysis or saponification which it is desired to obtain.

It is not essential to carry out the hydrolysis or saponification of the polymer by the stepwise addition of an aqueous solution of the alkaline hydrolyzing agent, since it is possible to add the solution of such agent to the polymer dispersion continuously as long as dilute aqueous solutions of such agent are used in the initial stages of hydrolysis, that is, until about 4 to 10% of the nitrile groups of the polymer are hydrolyzed, and as long as the polymer concentration is maintained sufficiently low to avoid the formation of coagulated polymer.

Although various alkaline hydrolyzing agents such as ammonia, sodium carbonate, sodium hydroxide and the like may be used in carrying out the hydrolysis or saponification of the polymers, the alkaline hydrolyzing agents other than the alkali metal hydroxides have one or more disadvantage, and, accordingly, it is definitely preferred to use an alkali metal hydroxide as, for example, sodium hydroxide for this purpose.

During the hydrolysis or saponification, as described above, it is preferred to agitate the polymer dispersion as by stirring or the like in order to avoid zones of high alkali content wherein the polymer is hydrolyzed too much or zones of low alkali content in which no appreciable hydrolysis or saponification takes place. It is also preferred to start with stable or substantially stable aqueous dispersions of polyacrylonitrile or the modified polyacrylonitrile since the subsequent saponification of the polymer is easier to carry out in practically every aspect than is the case where a suspension of coarse particles of polyacrylonitrile is used as the starting material.

As a result of the hydrolysis or saponification procedure, hereinbefore described, a smooth, viscous solution of a polyacrylonitrile in which at least 40% of the nitrile groups have been converted to

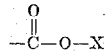

groups, wherein X is the cation of the alkaline hydrolyzing agent, is obtained. In the case of homopolymers of acrylonitrile and the polymers of acrylonitrile which have been modified with alkyl acrylates or vinyl acetate, from 40% to 80% of the nitrile groups are converted to

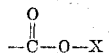

groups, wherein X has the same significance as given above. In the case of such homopolymer or copolymers, one reason why the saponification or hydrolysis is carried out to the extent of not more than 80% of the nitrile groups in the starting polymer is that the partially hydrolyzed polymer cannot be processed satisfactorily, as will appear more fully hereinafter. On the other hand, if less than 40% of the nitrile groups of the starting polymer are hydrolyzed, the utility of the polymer is adversely affected. In the case of polymers of acrylonitrile modified with styrene, ring substituted or alkyl methacrylates it is sometimes necessary to saponify or hydrolyze from 90 to 100% of the nitrile groups in the starting polymer, depending on the amount of modifying monomer combined in the polymer, in order to obtain a final polymer which has the desired solubility in acidic aqueous solutions.

After the hydrolysis or saponification of the polymer is carried out, the smooth viscous solution or dispersion thereof is first cooled. The reason for cooling will become apparent in the following description. After cooling, the smooth viscous solution is acidified with a strong mineral or organic acid which is capable of lowering the pH of the solution down to about 1.5 or lower. During the acidification the solution is preferably stirred or agitated, and the amount of acid used preferably should be sufficient to precipitate substantially all of the partially hydrolyzed polymer from solution, and preferably an amount which will lower the pH of the aqueous liquid to 1.5 or lower. In order to obtain a precipitated polymer which may be purified readily, it is usually necessary to obtain the precipitated polymer in the form of a coherent, plastic mass. This is accomplished by cooling the smooth, viscous solution of the polymer, prior to acidification, to a temperature at which a coherent, plastic mass of polymer is obtained when the solution is acidified. This temperature will vary depending on the particular polymer in solution and other factors. In general, if the solution of polymer is cooled below 60° C., prior to acidification a coherent, plastic mass of polymer is obtained on acidification providing the polymer solution is not cooled appreciably below 20° C., but superior results are obtained in most cases by cooling the smooth, viscous solution of the polymer to between 25 and 50° C. prior to acidification of the solution. If the temperature of the solution is too high prior to acidification, the acidified polymer tends to separate as a highly viscous liquid which emulsifies as fine particles and subsequent cooling does not aid materially since there is a tendency then to form lumps which do not coalesce readily and are hard to purify. If the temperature of the polymer solution is too low prior to acidification the acidified polymer tends to separate from the aqueous phase as particles or lumps which are quite difficult to purify. In general the lower temperatures, for example, between 20 and 35° C., are most suitable particularly in those instances where the polymer which is being acidified has been hydrolyzed to the extent of about 70 to 100%.

A wide variety of strong mineral or organic acids may be used to acidify the partially hydrolyzed polymers, including mineral acids such as sulfuric acid, hydrochloric acid and phosphoric acid, and strong organic acids such as oxalic acid. The mineral acids, and particularly sulfuric acid, are preferred, but the organic acids have advantages in that, in general, the use of organic acids enables the preparation of acidified polymers, from which films may be prepared without appreciable incompatibility of the electrolyte contained therein.

As a result of the acidification of the partially hydrolyzed polymer, the

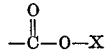

groups thereof, as defined above, are converted to carboxyl groups and the resulting polymer contains the same percentage of carboxyl groups as the

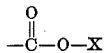

groups it formerly possessed. In a few instances the acidified polymers may be used as such, after separation from the aqueous phase, but since the precipitated polymers contain substantial amounts of electrolytes and free acid, which interfere to some extent with the utility of the polymers, it is definitely preferred to wash the polymers to remove a major portion or substantially all of the electrolytes or salts or free acids therefrom.

This washing of the acidified polymer is suitably carried out by stirring, kneading or working the polymer as a coherent, plastic mass in the presence of water which may or may not contain small amounts of an acid. In carrying out the washing of the polymer, it is preferred to maintain the wash water at a pH below 2.5 by stopping the washing operation before the pH rises above 2.5 or by using wash water containing an amount of acid sufficient to depress the pH of the wash water below 2.5, preferably an organic acid which is compatible with the polymers being prepared, such as the organic acids described above. If the pH of the wash water is allowed to rise appreciably above 2.5, some loss of polymer yield is experienced because of the increasing solubility of the polymer at higher pH values. However, it is possible to depress the solubility of the polymer at a pH slightly above 2.5 by the use of cold wash water, that is, wash water having a temperature below 20° C. and above its freezing point. In any event washing is preferably carried out until the polymer contains less than 2% of salts, based on the dry polymer solids.

The washed polymers may be dried at normal room temperature, vacuum dried or drum dried to form a solid, substantially anhydrous product. Such product may be shipped or stored for practical periods of time, and then dissolved in water with the aid of an alkali, if necessary, or in an organic solvent. The washed polymer may also be dissolved directly in water with the aid of small amounts of an alkali such as sodium hydroxide, ammonia or strong amines, without drying the polymer.

The novel polymers of this invention comprise a polyacrylonitrile polymer in which at least 40% of the nitrile groups have been hydrolyzed to carboxyl groups, and which is substantially free of salts. In the case of polymers prepared from homopolymers of acrylonitrile and polymers of acrylonitrile modified with alkyl acrylates and vinyl acetate only from 40 to 80% of the nitrile groups of the polymer are hydrolyzed to carboxyl groups. In such instances if more than 80% of the nitrile groups in the original polymer are hydrolyzed, the polymer is too soluble even at low pH values and therefore cannot be washed substantially free of electrolytes and acid, after acidification, without a substantial decrease in polymer yield. On the other hand, if less than 40% of the nitrile groups of such starting polymers are hydrolyzed, the polymer does not dissolve in water at low pH values and this seriously limits the utility of the polymer in certain types of application. Although the percent hydrolysis range of 40 to 80% for such type starting polymers is generally applicable for products derived from starting polymers of medium molecular weight, deviations of about 5% from the lower range of 40% or the upper range of 80% is possible when the hydrolyzed polymers are prepared from low or high molecular starting materials, respectively. Preferred polymers of this type are those which comprise from about 55 to 70% of carboxyl groups and from about 45 to 30% of other functional groups, including nitrile groups.

In the case of polymers of acrylonitrile modified with styrene, ring substituted styrene or alkyl methacrylates, the lower range of hydrolyzed nitrile groups is 40% as in the case of the polymers discussed above, but the upper range of hydrolyzed nitrile groups may vary up to 100%. In other words, from 40 up to 100% of the nitrile groups in the starting polymer may be hydrolyzed to carboxyl groups. The upper range may be 80% when the amount of modifying styrene or alkyl methacrylate in the polymer is low, but must be increased up to 100% as the maximum permissible amounts of modifying styrene or alkyl methacrylates are approached.

A further understanding of the processes and polymers described herein will be obtained from the following specific examples which are intended to illustrate this invention, but not to limit the scope thereof, parts and percentages being by weight unless otherwise specified.

Example I

A mixture of 4 parts of acrylic acid, 18 parts of methyl acrylate, 160 parts of acrylonitrile and 0.36 part of benzoyl peroxide was added gradually over a period of 20 minutes, with stirring, to a solution of 3.6 parts of petroleum sulfonate (Acto 450) and 1.8 parts of potassium persulfate in 1000 parts of water, which solution was maintained at reflux temperature (which was initially about 70° C.) under a reflux condenser. Heating of the resulting emulsion was continued under reflux conditions until the temperature of the emulsion rose to 90° C. and then a minor amount of residual monomers was distilled from the resulting polymer dispersion, which contained about 15% polymer solids. The polymer in the dispersion consisted of about 88% of combined acrylonitrile, about 10% of combined methyl acrylate and 2% of combined acrylic acid.

Five hundred parts of the polymer dispersion or emulsion, prepared as described immediately above, was treated with 28% aqueous ammonia, while stirring, until a slightly alkaline mixture was obtained. Six hundred parts of a 10% aqueous sodium hydroxide were then added to the mixture while stirring vigorously, and hydrolysis or saponification of the polymer was effected by heating the resulting mixture for 1 hour at 120° C. At the end of this time, the resulting smooth viscous solution was cooled to room temperature (about 30° C.), and then acidified with 110 parts of a 50° aqueous sulfuric acid solution, while stirring slowly. As a result of the acid addition, a coherent, plastic mass of polymer was formed. This polymer contained about 65% of carboxyl groups, based on the total carboxyl groups, ester groups and nitrile groups in the polymer. The coherent, plastic mass of polymer was washed with water while stirring the mass slowly, until the mass was substantially free of sulfates. The mass was drained and was then dissolved in water with the addition of sufficient sodium hydroxide to provide a solution having a pH of 3.5.

The resulting solution may be used as a thickening composition for printing pastes in conjunction with natural gums or as an application medium for acid resistant dyes or pigment. If the polymer mass is dissolved in water with ammonia or an amine, the composition may be used as a pigment binder.

Example II

A mixture of 97 parts of monomeric acrylonitrile and 3 parts of acrylic acid was added continuously and gradually over a period of 30 minutes, with stirring, to a solution of 565 parts of water containing 0.5% of a sodium petroleum sulfonate (Acto 45), 0.5% of potassium persulfate and 0.3% of n-dodecyl mercaptan, all percentages being based on the monomers, which solution was maintained at reflux temperature (which was initially about 70° C.) under a reflux condenser. The polymerization was substantially complete in 50 minutes, after which a small amount of residual nitrile was removed by distillation. A coarse suspension containing about 15% of polymer solids consisting of about 98% of combined acrylonitrile and about 2% of combined acrylic acid was obtained.

Five hundred parts of the polymer suspension, prepared as described immediately above, was treated with 28% aqueous ammonia, while stirring, until a slightly alkaline mixture was obtained. Six hundred parts of a 10% aqueous sodium hydroxide solution were then added to the mixture while stirring vigorously, and hydrolysis or saponification of the polymer was effected by heating the resulting mixture for 1 hour at 130° C. At the end of this time, the resulting smooth viscous solution was cooled to room temperature (about 30° C.), and then acidified with 110 parts of a 50% aqueous sulfuric acid solution, while stirring slowly. As a result of the temperature of the mixture and the acid addition, a coherent, plastic mass of polymer was formed. This polymer contained about 65% of carboxyl groups, based on the total carboxyl and nitrile groups in the polymer. The coherent, plastic mass of polymer was washed with water initially and finally with water which contained sufficient formic acid to maintain the pH of the wash water below 2.5 while stirring the mass slowly, until the mass was substantially free of formates or other salts. The mass was drained and dried under a vacuum until a solid, substantially salt-free and anhydrous product was obtained. This product was readily soluble in water containing sufficient sodium hydroxide to provide a final solution having a pH of 3.5. The solution of polymer has substantially the same utility as the solution described in the third paragraph of Example I.

Example III

Five hundred parts of a stable aqueous dispersion containing about 15% of a homopolymer of acrylonitrile and 10% of sodium petroleum sulfonate, based on the homopolymer, was processed as described in the second paragraph of Example II. The product obtained had substantially the same characteristics as the product of Example II.

In general, the novel polymers of this invention are soluble in water at a pH above 2.5, and aqueous solutions of such polymers may be used as thickening agents in printing pastes, as sizing solutions for cotton or regenerated cellulose or cellulose acetate yarns, as dispersing media for dyes and pigments and as stiffening agents in textile finishing compositions.

Various changes and modifications may be made in the polymers and processes described herein as will be apparent to those skilled in the art to which this invention appertains without departing from the spirit and intent of this invention. Accordingly, it is intended that this invention is not to be limited except by the scope of the appended claims.

This application is a continuation-in-part of my application Serial No. 301,965, filed July 31, 1952, now U. S. Patent No. 2,727,835.

What is claimed is:

1. A process of preparing polymeric derivatives which comprises treating a substantially stable aqueous dispersion comprising an emulsifying agent and a polyacrylonitrile with an aqueous solution of an alkali metal hydroxide, said dispersion and solution containing less than 15% by weight of polyacrylonitrile, heating the resulting dispersion in the presence of sufficient of said hydroxide to saponify from about 4 to 10% of the nitrile groups of the polyacrylonitrile, then adding a further amount of said aqueous solution containing sufficient hydroxide to saponify from 40 to 80% of said polyacrylonitrile and heating the resultant dispersion until 40 to 80% saponification is attained, treating the resulting solution with an acid selected from the group consisting of strong mineral and organic acids which are capable of lowering the pH of the polymer solution to at least 1.5 until acidified polymer separates from the aqueous phase, the temperature of the acidified polymer being adjusted to provide a coherent, plastic mass, and then washing the mass with water until the mass is substantially free of salts.

2. A process as in claim 1 wherein the alkali metal hydroxide is sodium hydroxide.

3. A process as in claim 1 wherein the acid is sulfuric acid.

4. A process as in claim 1 wherein the water employed in washing the mass contains an organic acid.

5. A process as in claim 1 wherein the washed mass is separated from the water and dried.

(References on following page)

References Cited in the file of this patent

UNITED STATES PATENTS

| | | |
|---|---|---|
| 1,984,417 | Mark | Dec. 18, 1934 |
| 2,200,709 | Trommsdorf | May 14, 1940 |
| 2,263,385 | Grimm | Nov. 18, 1941 |

FOREIGN PATENTS

| | | |
|---|---|---|
| 358,534 | Great Britain | Oct. 6, 1931 |

OTHER REFERENCES

Krczil, Kurzes Handbuch der Polymerizationstechnik, Bd II, pages 261–262 (1945), published by Edward, Ann Arbor, Mich.